G. F. Woolston,
Saw.

Nº 8,393. Patented Sep. 30, 1851.

UNITED STATES PATENT OFFICE.

GEORGE F. WOOLSTON, OF DISTRICT OF ORANGEBURG, SOUTH CAROLINA.

SAW FOR SAWING AND SMOOTHING BOARDS.

Specification of Letters Patent No. 8,393, dated September 30, 1851.

*To all whom it may concern:*

Be it known that I, GEORGE F. WOOLSTON, of the district of Orangeburg and State of South Carolina, have invented a new Improvement in Teeth of Saws, which is for the purpose of planing lumber in the operation of sawing, or producing a smoother surface, so that it may be the more easily planed; and I do hereby declare that the following is a full, clear, and exact description of the same, reference being had to the annexed drawings, making a part of this specification, in which—

Figure 1:
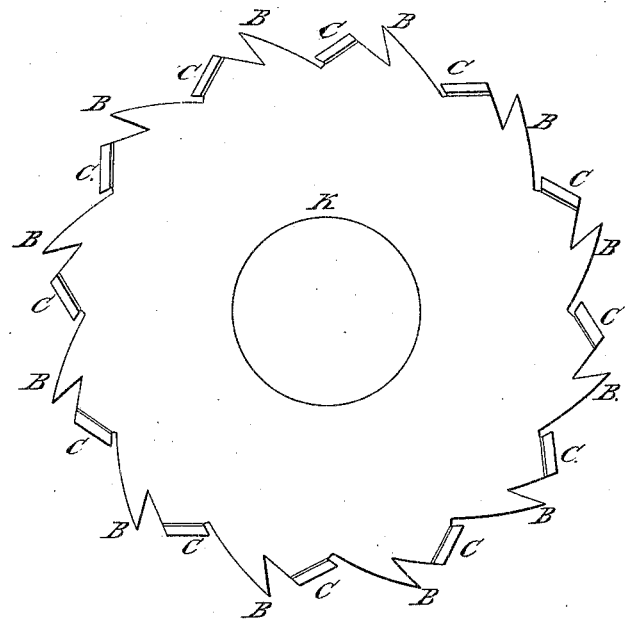
Figure 2:
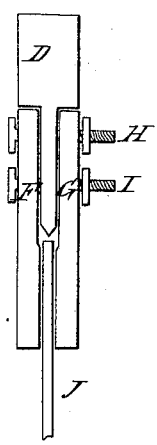
Figure 3:
Figure 4:
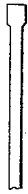

Figure 1 represents a circular saw; B, teeth of the usual form for sawing; C, teeth formed with a groove in the underpart, so as to form double edged chisels;—having sharp edges at the sides for the purpose of planing; and may be set so as to cut slantwise. The planing teeth may be formed or set, by a process which will be understood by reference to Fig. 2, in which D represents a wedge, formed of parts D F and G, connected and held firmly together by screws H and T. J represents an edge view of the tooth before it is set. By applying a hammer to the wedge, a groove may be formed in the under part of the tooth, the tooth widened, and sharp edges formed at the sides. Fig. 3 represents an edge view of the tooth after it is set. Or the teeth for planing may be formed without a groove, as represented by Fig. 4, by being widened, and having square edges at the sides. In circular saws, to prevent back scratching, a thin circular plate may be attached to the saw, as represented by the line K; so as to be between the log and the saw blade.

I claim, for the purposes above set forth,

Forming and arranging teeth of saws substantially as herein described.

GEORGE F. WOOLSTON.

Witnesses:
  JOHN LECKIE,
  JAMES JONES.